United States Patent [19]
Shinohara et al.

[11] Patent Number: 5,678,803
[45] Date of Patent: Oct. 21, 1997

[54] FLUID CONTROLLER

[75] Inventors: Tsutomu Shinohara; Nobukazu Ikeda; Kazuhiro Yoshikawa; Tetsuya Kojima, all of Osaka, Japan

[73] Assignee: Fujikin, Incorporated, Osaka, Japan

[21] Appl. No.: 684,695

[22] Filed: Jul. 22, 1996

[30] Foreign Application Priority Data

Jul. 24, 1995 [JP] Japan ................... 7-187382

[51] Int. Cl.⁶ .................................................. F16K 31/00
[52] U.S. Cl. .................... 251/368; 251/335.2; 251/335.3
[58] Field of Search .................... 251/331, 335.2, 251/335.3, 368

[56] References Cited

U.S. PATENT DOCUMENTS

| | | | |
|---|---|---|---|
| 4,723,518 | 2/1988 | Kawasaki et al. | 251/368 |
| 4,754,950 | 7/1988 | Jada et al. | 251/368 |
| 4,995,589 | 2/1991 | Adishian et al. | 251/335.3 |
| 5,031,878 | 7/1991 | Ishikawa et al. | 251/368 |
| 5,295,662 | 3/1994 | Yamaji et al. | 251/335.2 |
| 5,351,936 | 10/1994 | Tonikawa et al. | 251/335.3 |

*Primary Examiner*—A. Michael Chambers
*Attorney, Agent, or Firm*—Griffin, Butler Whisenhunt & Kurtossy

[57] ABSTRACT

Flaws in a fluid controller caused by nonmetallic inclusions in material during machining of a contact surface of a valve seat are prevented by forming the valve seat of corrosion-resistant high-cleanliness material. The valve seat of the fluid controller is formed from corrosion-resistant alloy with 0.05% or less cleanliness and containing in weight ratio 12.90–15.00% Ni, 16.50–18.00% Cr, 2.00–3.00% Mo, 0.02% or less C, 0.30% or less Si, 0.40% or less Mn, 0.03% or less P, 0.003% or less S, 0.25% or less Cu, and 0.01% or less Al. Fluid leakage is almost completely prevented (100%) by such a valve seat.

5 Claims, 3 Drawing Sheets

FLUID CONTROLLER

BACKGROUND OF THE INVENTION

1. Field of the Invention

This invention relates to an improvement to fluid controllers used in, for example, semiconductor manufacturing plants, nuclear power generation plants, pharmaceutical and food manufacturing facilities, and more specifically, to a fluid controller designed to eliminate almost all (100%) leakage of fluid caused by valve seats.

2. Description of the Prior Art

Generally, in pipelines handling high-purity gas for semiconductor manufacturing plants, etc., fluid controllers employing direct touch type metal diaphragms are widely used to improve gas replaceability, or to prevent degradations in gas purity.

FIG. 3 shows one example, where a fluid controller comprises a body 20 in which are formed an inflow passage 20a, an outflow passage 20b, a valve chamber 20c, and a valve seat 20d. A metal diaphragm 21, disposed in the valve chamber 20c, is opposite the valve seat 20d and designed to maintain air-tightness of the valve chamber 20c and, at the same time, to be elastically deformed vertically to contact and move away from the valve seat 20d. A bonnet 22 is mounted on an outer periphery of the diagram 21 for holding the outer periphery against the body 20, with a cap screw 23 being screwed onto the body 20 for pressing, and thereby fixing, the bonnet 22 to the body 20. A stem 24 elevatably penetrates through, and is supported by, the bonnet 22 for elastically deforming the diaphragm 21, and a handle 25 is attached to the stem for rotating and operating the stem 24 (Japanese Patent Publication No. Hei 4-54104).

In this fluid controller, when the stem 24 is lowered, it presses the center of the diaphragm 21 downwards to come into contact with the valve seat 20d and close a clearance between the inflow passage 20a and the outflow passage 20b. When the stem 24 is raised, the diaphragm 21 is returned to its original shape by its elasticity and fluid pressure, and thereby opens the clearance between the inflow passage 20a and outflow passage 20b.

Because this kind of fluid controller can reduce a space volume of the valve chamber 20c, it has excellent advantages in that gas replaceability can be improved and, at the same time, sliding portions of members in the valve chamber 20c are reduced so that generation of particles which form dust can be prevented.

However, in order to improve airtightness between the diaphragm 21 and the valve seat 20d, the valve seat 20d is generally formed of synthetic resin. Consequently, the fluid controller has the disadvantages that it is troublesome to affix the valve seat 20d to the body 20 and a fluid purity is likely to be degraded due to emission of gas from the synthetic resin; furthermore, corrosion resistance of such a valve seat 20d is poor.

On the other hand, in order to avoid problems arising from the above-mentioned synthetic resin valve seats, so-called metal direct touch type diaphragm fluid controllers, in which the valve seat 20d is formed separately (or integrally with the body 20) of corrosion-resistant alloys (for example, stainless steel, etc.), have been developed and have been widely put to practical use.

The above-mentioned metal direct-touch type fluid controllers exhibit high corrosion resistance of the valve seat 20d and generate comparatively small amounts of particles, and exhibit outstanding practical effects.

However, there are many problems for solutions involving metal direct touch type fluid controllers using metal diaphragms as valve elements; above all, a particularly important problem is fluid leakage from the valve seat 20d.

That is, for fluid controllers used in semiconductor manufacturing facilities, etc., fluid leakage when valves are totally closed is never allowed, and should any fluid leakage occur, the leaked fluid (gas) will mix with a high-purity semiconductor manufacturing gas, thereby increasing a defect rate of products and at the same time excessively degrading a quality of products (semiconductors).

Because, for a conventional valve seat 20d made of SUS316 or SUS316L stainless steel, there are a significant amount of impurities (nonmetallic inclusions) contained in raw materials, even if a machining precision is improved for the valve seat 20d and a contact surface of the valve seat is smoothed to a high precision by electrolytic polishing or chemical polishing, it is impossible to eliminate 100% formations of pits caused by nonmetallic inclusions in the raw materials.

As a result, even if the outer surface of the diaphragm valve element is perfectly smooth and completely free of defects, "flaws" caused by nonmetallic inclusions, which cannot be visually identified, are formed on the valve seat 20d surface during machining, resulting in leakage of fluid.

Thus, the inventors of this invention carried out an investigation on fluid leakage caused by flaws in valve seat surfaces due to nonmetallic inclusions in raw materials. Results of these investigations showed that, in the case of a stainless steel (SUS316, SUS316L) valve seat 20d: (1) "flaws A" (FIG. 4) caused by nonmetallic inclusions in raw materials were formed in comparatively large numbers in a direction of drawing material which forms the valve seat 20d, which "flaws A" were extremely difficult to identify when they were observed from directly above with a microscope (magnification: about 40×); and (2) these "flaws" were observed with clarity and became easier to identify by observing the valve seat contact surface 20d obliquely and changing a light incidence direction (see FIG. 4).

The "flaws A" of the valve seat contact surface 20d are such that they can be completely eliminated by a rubbing operation in which #2000 sandpaper is allowed to lightly slide five to six times on the valve seat contact surface 20d and this same sliding operation, using a new sandpaper, is repeated about 5 times. That is, it has been confirmed that He leakage can be nearly completely eliminated from the valve seat 20d by such rubbing operation using sandpaper.

It is an object of this invention to solve the problems described above in fluid controllers using conventional metal valve seats, that is, to solve the problems: (1) that fluid leakage is likely to occur due to "flaws A" formed on valve seat contact surfaces resulting from nonmetallic inclusions in material forming the valve seats; and (2) that because the "flaws A" are extremely difficult to discover, even if the "flaws A" themselves are shallow and small, it is comparatively troublesome to stop fluid leakage.

It is, therefore, an object of the present invention to provide a flow controller which can 100% eliminate fluid leakage occurring due to non-metallic inclusions in the material.

SUMMARY OF THE INVENTION

This invention is, basically, to form a valve seat in a fluid controller with an alloy containing in weight ratio: 12.90–15.00% Ni; 16.50–18.00% Cr; 2.00–3.00% Mo; 0.02% or less C; 0.30% or less Si; 0.40% or less Mn; 0.03% or less P; 0.003% or less S; 0.25% or less Cu; and 0.01% Al; their being 0.05% or less cleanliness. The fluid controller comprises: a body defining the valve seat located on a bottom surface of a recessed valve chamber in free communication with an inflow passage and an outflow passage; a valve element disposed in the valve chamber opposite the valve seat; a bonnet fixed to a surface of the body for closing a top opening of the valve chamber; and a stem elevatably inserted through and supported by the bonnet for raising and lowering the valve element.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
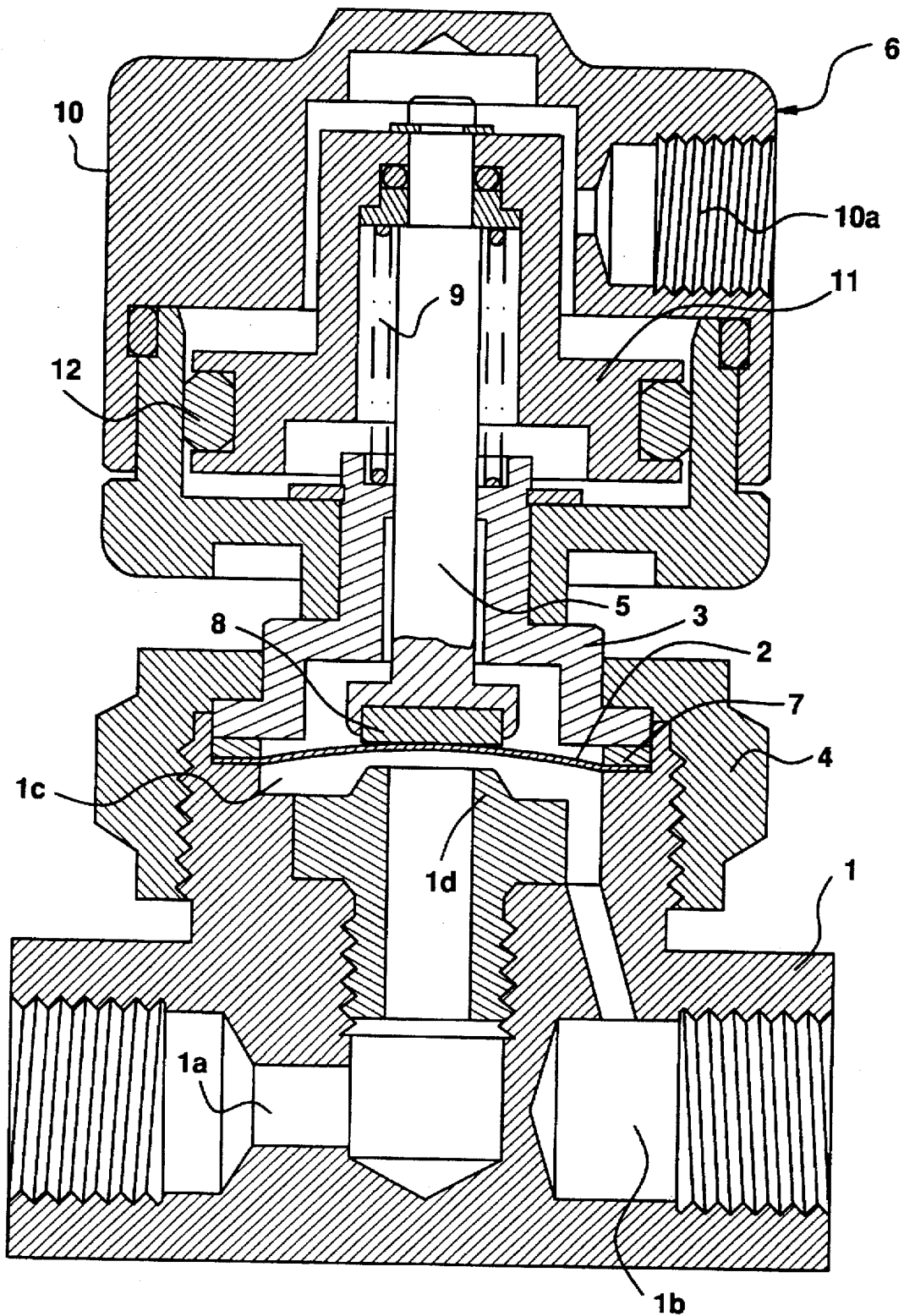
FIG. 1 is a longitudinal cross sectional view of one embodiment of this invention.

This invention is, fundamentally, to form a valve seat with an alloy containing 12.90–15.00% Ni, 16.50–18.00% Cr, 2.00–3.00% Mo, 0.02% or less C, 0.30% or less Si, 0.40% or less Mn, 0.03% or less P, 0.003% or less S, 0.25% or less Cu, and 0.01% Al in weight ratio, with 0.05% (impurities) or less cleanliness, in a fluid controller comprising: a body defining a valve seat $1d$ located on a bottom surface of a recessed valve chamber $1c$ in free communication with an inflow passage $1a$ and an outflow passage $1b$; a valve element 2 disposed in the valve chamber $1c$ opposite the valve seat $1d$; a bonnet 3 fixed to a surface of the body 1 for closing a top opening of the valve chamber $1c$; and a stem 5 elevatably inserted through and supported by the bonnet for raising and lowering the valve element 2.

Because nonmetallic inclusions are scarcely contained in a material of high-purity alloy which forms the valve seat $1d$, no pits caused by nonmetallic inclusions are formed on the contact surface of the valve seat during machining of the valve seat; and as a result, fluid leakage arising from pits caused by nonmetallic inclusions is 100% eliminated.

Since a purity of the material is 0.05% or less (in terms of a cleanliness specified in JIS G 0555) in the fluid controller (having a passage of 1–5 mmØ in diameter for a fluid used for semiconductor manufacturing facilities, etc.), it has been confirmed that flaws attributable to nonmetallic inclusions are scarcely formed on the contact surface of the valve seat.

Referring now in more details to the drawings, one embodiment of this invention will be described in detail. FIG. 1 shows one example of an embodiment of this invention in which a fluid controller includes the body 1 having the valve seat $1d$, a metal diaphragm forming the valve element 2, the bonnet 3, a bonnet nut 4, the stem 5, and a fluid pressure actuator 6; the fluid controller being a normally direct touch diaphragm type fluid controller.

The body 1 of the controller is of stainless steel (for example, SUS316L, etc.) with: the valve seat $1d$ being installed on a bottom surface of the recessed valve chamber $1c$ in free communication with the inflow passage $1a$ and the outflow passage $1b$; the metal element (a diaphragm) 2 being arranged in the valve chamber $1c$ opposite the valve seat $1d$ to hold airtightness of the valve chamber $1c$ and at the same time to be elastically deformed vertically to come into contact with, and move away from, the valve seat $1d$; the bonnet 3 (of stainless steel) being mounted on an outer periphery of the diaphragm 2 for holding the outer periphery of the diaphragm 2, via a gasket 7, against the body 1; the stainless steel bonnet nut 4 being screwed to the body 1 for pressing, and thereby fixing, the bonnet 3 to a body 1 surface; the stem 5 (of stainless steel) being arranged for elastically deforming the diaphragm 2 downwards, a synthetic resin (for example, polyimide, etc.) or synthetic rubber diaphragm presser 8 fitted to the bottom end of the stem 5; a coil spring 9 being arranged for thrusting the stem 5 upwards; and a fluid pressure actuator (a pneumatic actuator) 6 having a cylinder construction for driving the stem 5 downwards with operating air.

The valve seat $1d$ is formed of a high-cleanliness alloy, as is described below, and is screwed to the body 1.

In addition, the pneumatic actuator 6 includes: a cylinder 10 fixed above the bonnet 3 in such a manner as to accommodate a top of the stem 5 protruding from the bonnet 3 and having an operating air feed port $10a$, a piston 11 fixed to the top end of the stem 5 and moving in a vertical direction inside the cylinder 10, and an O-ring 12 fitted to an outer circumferential surface of the piston 11 and sliding vertically on an inner circumferential surface of the cylinder 10.

In the fluid controller, when operating air is fed into the cylinder 10 via the operating air feed port $10a$, the piston 11 and the stem 5 are lowered, thereby overcoming an elastic force of the coil spring 9 and a center of the diaphragm 2 is pressed downwardly by the stem 5. As a result, the diaphragm 2 comes into contact with the valve seat $1d$ to close communication between the inflow passage $1a$ and the outflow passage $1b$ (closed valve condition).

When this feed of operating air is stopped, and pressure inside the cylinder 10 is released, the piston 11 and the stem 5 rise due to the elastic force of the coil spring 9, and, with this movement, the diaphragm 2 returns to its original form due to its elastic force and fluid pressure inside the body 1. As a result, the diaphragm 2 moves away from the valve seat $1d$ and the inflow passage $1a$ and the outflow passage $1b$ are in free communication (open valve condition).

In the FIG. 1 embodiment, the valve seat $1d$, formed separately of a high cleanliness alloy, is designed to be screwed to the body 1, but the whole body 1 may be formed of the high-cleanliness alloy to form the valve seat $1d$ integrally at the bottom surface of the valve chamber.

In FIG. 1, the metal diaphragm 2 is used as the valve element 2 and is designed to be pressed downwardly by the diaphragm presser 8 mounted on .the bottom end of the stem 5, but the diaphragm 2 may be fixed to the bottom end of the stem 5 to come into contact with, or move away from, the valve seat $1d$.

The valve seat $1d$ is formed from a high-cleanliness alloy of 0.05% or less cleanliness. The alloy contains 12.90–15.00% Ni, 16.50–18.00% Cr, 2.00–3.00% Mo, 0.02% or less C, 0.30% or less Si, 0.40% or less Mn, 0.03% or less P, 0.003% or less S, 0.25% or less Cu, and 0.01% or less Al in weight ratio.

The alloy has the N content restricted to 150 ppm or less, the O restricted to 20 ppm or less, and the H restricted to 5.0 ppm or less, respectively.

In addition, the alloy is manufactured from steel ingot melted by the so-called vacuum double melting method, and after undergoing hot-working at a forging ratio equivalent to 3S or more in total, it undergoes (solid-) solution heat treatment (temperature 1010°–1150° C. and water cooled), and provides the mechanical properties shown in Table 1.

The S is expressed as $W_0 \times h_0/h_1 \times W_1$, where $W_0 \times h_0$ is the original cross sectional area perpendicular to a direction in which major streams (grains) are generated by forging, and $h_1 \times W_1$ is an initial cross sectional area.

TABLE 1

| 0.2% Proof stress | Tensile strength | Elongation | Reduction | Hardness |
|---|---|---|---|---|
| (N/mm$^2$) 175 or more | (N/mm$^2$) 480 or more | (%) 40 or more | (%) 60 or more | (HB) 187 or more |

Table 2 shows the results of corrosion resistance test of the alloy, together with corrosion resistance of S316L for comparison.

TABLE 2

| | General corrosion | | | Intergranular corrosion resistance | | |
|---|---|---|---|---|---|---|
| Steel grade | 1% HCl Room temperature 6 Hr | 5% H$_2$SO$_4$ Room temperature 6 Hr | Pitting resistance 6% FeCl$_2$ 35° C. 24 Hr | Strauss Copper sulphate-sulpuric acid | Huey 65% boilding nitric acid As solution treated | Sensitization |
| SUS316L general item | 0.25 g/m$^2$h | 0.07 g/m$^2$h | 11.61 g/m$^2$h | 0.21 g/m$^2$h | 0.505 g/m$^2$h | 0.939 g/m$^2$h |
| Alloy used for this invention | 0.02 g/m$^2$h | 0.02 g/m$^2$h | 1.47 g/m$^2$h | 0.15 g/m$^2$h | 0.171 g/m$^2$h | 0.211 g/m$^2$h |

Of the composition of the alloy, Ni, Cr, and Mo except iron group serve to have effects of improving corrosion resistance primarily in an oxidizing or reducing environment, and it would be difficult to achieve the corrosion resistance and high cleanliness when the compositions deviate from the range of 12.90–15.00% Ni, 16.50–18.00% Cr, and 2.00–3.00% Mo.

In order to suppress separation of carbide due to thermal effects of welding, etc., C is restricted to 0.02% or less, respectively.

In addition, Si is useful for improving the corrosion resistance or elasticity, but from a viewpoint of prevention of toughness degradation or reduction in nonmetallic inclusions, it is restricted to 0.30% or less.

Similarly, Cu is restricted to 0.25% or less from a viewpoint of preventing a degradation of hot workability or reduction of nonmetallic inclusions, and Al is restricted to 0.01% or less to prevent deterioration of surface quality or reduce nonmetallic inclusions.

In addition, Mn is restricted to 0.40% or less from a viewpoint of preventing lowered corrosion resistance near welds, or P and S are restricted to 0.03% or less and 0.003% or less, respectively, from a viewpoint of reducing so-called harmful substances to reduce nonmetallic inclusions.

Concerning cleanliness of the alloy, the alloy used in this invention has a cleanliness specified in JIS G 0555 restricted to 0.05% or less, and in order to achieve this cleanliness, vacuum double melting treatment is carried out to reduce a content of impurity elements to a minimum as well as to obtain stable ingots, free from segregation.

In JIS G 0555, a cleanliness d (%) of steel (alloy) is defined as $d=(n/p \times f) \times 100\%$, where p is a number of total lattice points (400 points) on a glass plate in a visual field, f is a number of visual fields (60), and n is a number of lattice point centers occupied by nonmetallic inclusions in f pieces of visual fields (observed by microscope at a 400× magnification).

Consequently, if the cleanliness is 0.05%, magnification 400×, f=60, and p=400 points, $n=d \times p \times f \times (1/100)=0.05 \times 400 \times 60/100=12$ pieces.

That is, the number of lattice points occupied by inclusions (oxides viscous-deformed by working, granular oxides noncontinuously arranged in the working direction, oxides unorderly dispersed without viscous deformation) in the lattice points (400 points×60 visual fields–24,000 pcs.) for 60 visual fields of the actual inspected surface (about 0.2 mm ⌀ dia.), which are the visual fields of a 400× magnification microscope, is 12 points or less.

Figure 2:
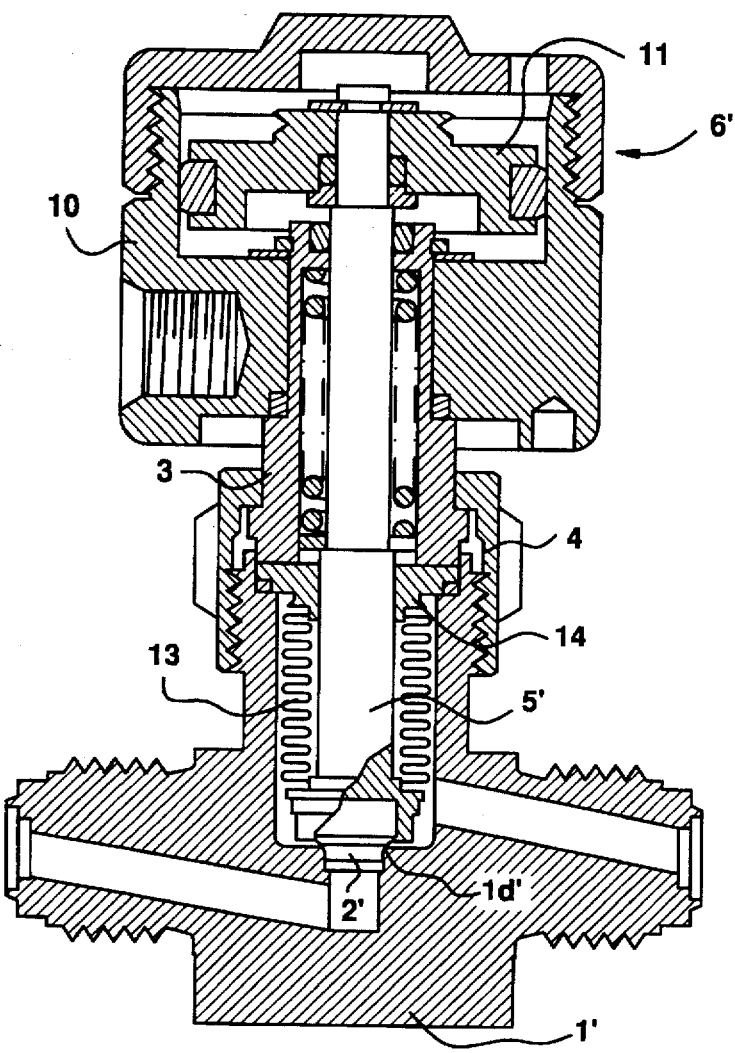
FIG. 2 is a longitudinal cross-sectional view of another embodiment of this invention.
Figure 4:
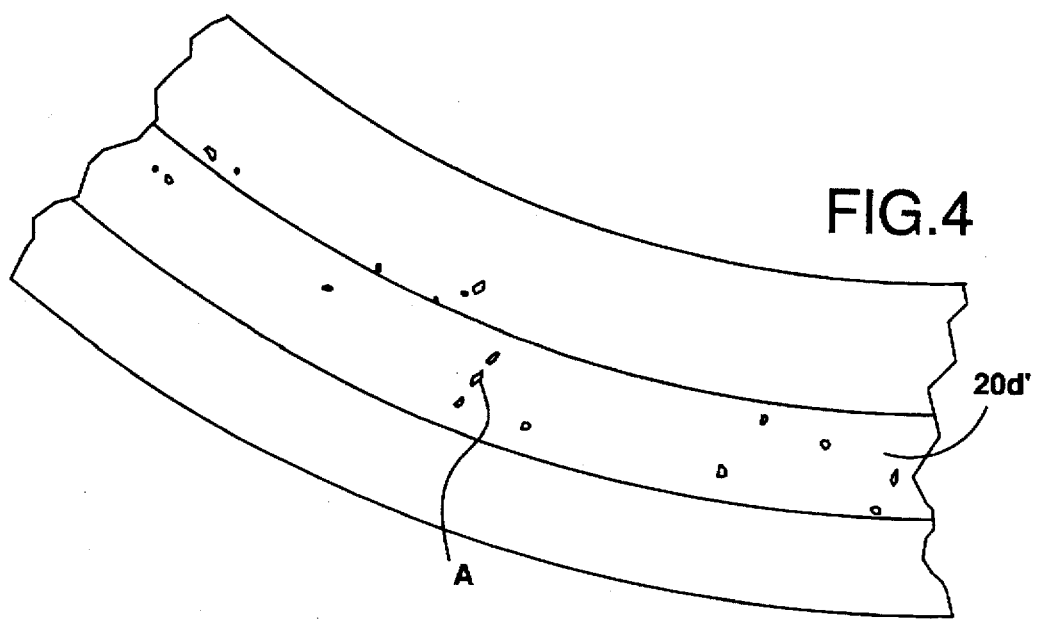
Figure 3:
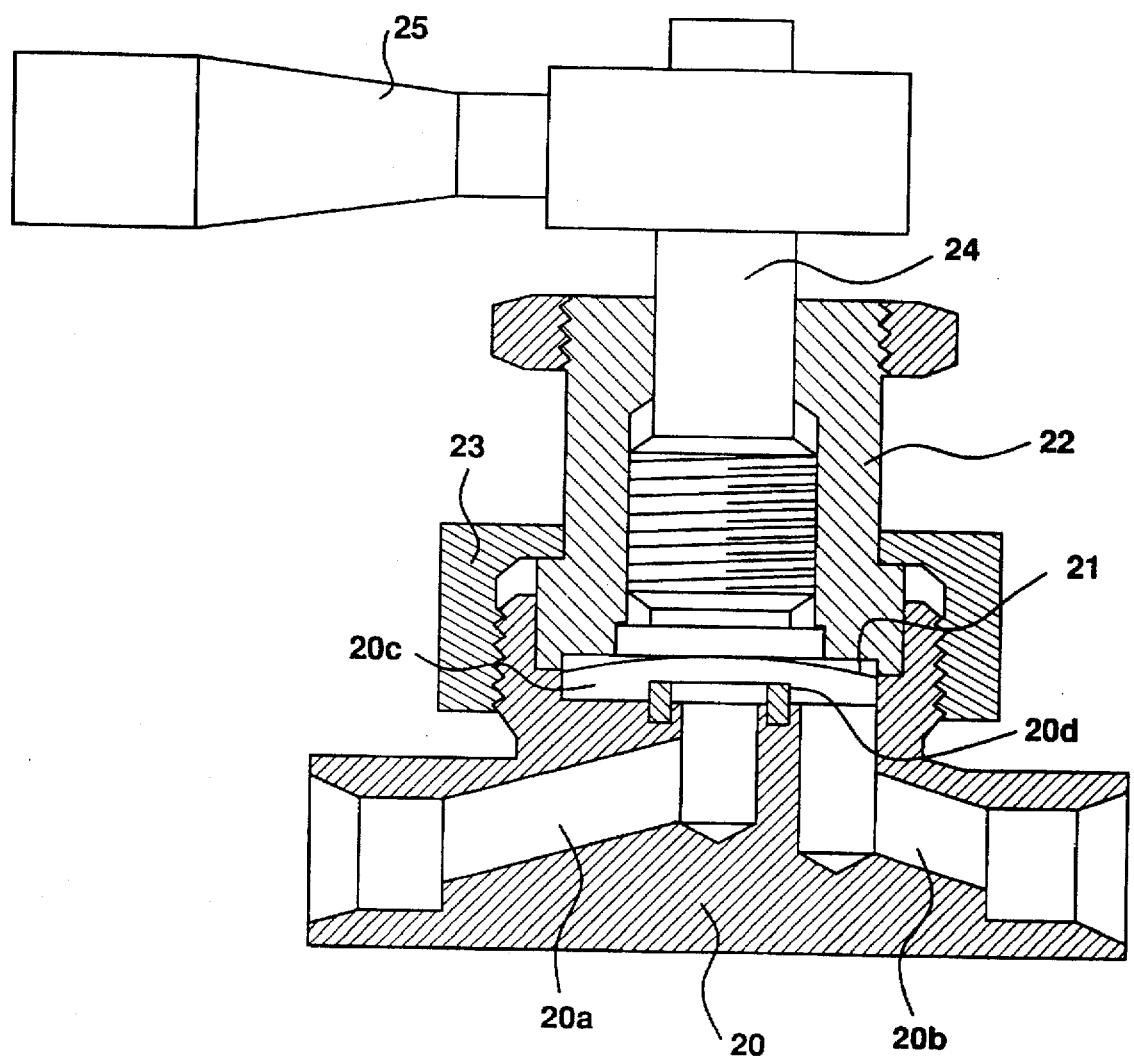
FIG. 3 is a longitudinal cross-sectional view of one example of a Conventional fluid controller; and, FIG. 4 shows schematically an example of flaws arising from nonmetallic inclusions in material used to form a valve seat contact surface.

In FIG. 2, numeral 2' denotes a valve element, 5' a stem, 6' a pneumatic actuator, 13 a bellows, and 14 a bellows support; with an airtight partition between the valve chamber 1c' and the stem 5', being held by the bellows 13.

In this embodiment, the body 1', equipped with the valve seat 1d'; is formed using the high-cleanliness alloy. It has been confirmed that as a result, leakage of fluid caused by flaws formed in the valve seat 1d' due to nonmetallic inclusions in the material can be nearly completely eliminated. An inner wall surface of the fluid passage is extremely clean and is stable with no gas emission, etc., thereby achieving nearly complete prevention of fouling of the fluid.

In this invention, because a valve seat installed at a bottom surface of a valve chamber of a fluid controller is formed with a high cleanliness alloy of 0.05% or less cleanliness and having specific component contents, even when the contact surface of the valve seat is finished by polishing, pits due to nonmetallic inclusions in the material are not formed on the polished surface. As a result, fluid leakage due to pits can be nearly completely prevented.

In a fluid controller in which a valve seat is formed integrally with a body of high-cleanliness alloy, gas emissions, etc. from an outer surface of a fluid passage is nearly eliminated, and fluid fouling can be nearly completely prevented.

As described above, this invention provides outstanding practical effects in a gas supply system for semiconductor manufacturing in which high-purity fluid is handled.

What is claimed is:

1. A fluid controller comprising:
   a body having a valve seat at a surface of a recessed valve chamber which is in free communication with an inflow passage and an outflow passage;
   a valve element disposed in the valve chamber opposite the valve seat;
   a bonnet fixed to a body surface and designed to close the top opening of the valve chamber; and, a stem movably inserted through, and supported by, the bonnet for moving the valve element toward and away from the valve seat;

wherein the valve seat is formed of an alloy, having a cleanliness which is 0.05% or less and which contains in weight ratio 12.90–15.00% Ni, 16.50–18.00% Cr, 2.00–3.00% Mo, 0.02% or less C, 0.30% or less Si, 0.40% or less Mn, 0.03% or less P, 0.003% or less S, 0.25% or less Cu, and 0.01% or less Al.

2. A fluid controller according to claim 1 wherein the alloy is designed to contain 150 ppm or less N, 20 ppm or less O, and 5.0 ppm or less H.

3. A fluid controller according to claim 1 wherein the valve element is a metal diaphragm which is disposed in the valve chamber opposite the valve seat, and whose outer circumferential edge is held between the bonnet and the body to hermetically seal an opening of the valve chamber wherein the metal diaphragm elastically deforms to close on the valve seat.

4. A fluid controller according to claim 1 wherein the valve seat is formed integrally with the body.

5. A fluid controller according to claim 1 wherein the alloy which forms the valve seat is solution-heat-treated after hot working, and further drawn.

* * * * *